(12) United States Patent
Ruppert

(10) Patent No.: US 12,424,963 B2
(45) Date of Patent: Sep. 23, 2025

(54) MOTOR VEHICLE HAVING AN EXTERNALLY EXCITED SYNCHRONOUS MACHINE

(71) Applicant: AUDI AG, Ingolstadt (DE)

(72) Inventor: Daniel Ruppert, Lenting (DE)

(73) Assignee: Audi AG, Ingolstadt (DE)

( * ) Notice: Subject to any disclaimer, the term of this patent is extended or adjusted under 35 U.S.C. 154(b) by 114 days.

(21) Appl. No.: 18/358,863

(22) Filed: Jul. 25, 2023

(65) Prior Publication Data
US 2024/0039449 A1 Feb. 1, 2024

(30) Foreign Application Priority Data
Jul. 26, 2022 (DE) .......... 102022118619.9

(51) Int. Cl.
*H02H 7/09* (2006.01)
*H02K 11/33* (2016.01)
*H02P 29/024* (2016.01)

(52) U.S. Cl.
CPC .......... *H02P 29/0241* (2016.02); *H02K 11/33* (2016.01)

(58) Field of Classification Search
CPC .... H02P 29/0241; H02P 29/024; H02P 6/085; H02P 27/06; H02P 6/14; H02P 25/022
See application file for complete search history.

(56) References Cited

U.S. PATENT DOCUMENTS

| 9,059,584 B2 | 6/2015 | Spannhake et al. | |
| 10,862,374 B2 | 12/2020 | Sudan et al. | |
| 2020/0014309 A1 * | 1/2020 | Mortensen | H02M 5/4585 |

FOREIGN PATENT DOCUMENTS

| CN | 206674281 U | 11/2017 | |
| CN | 111864698 A | 10/2020 | |
| DE | 102010001626 A1 | 8/2011 | |
| DE | 102013104847 A1 * | 11/2014 | H02H 7/16 |
| DE | 102014201903 A1 | 8/2015 | |
| DE | 102014209607 A1 | 11/2015 | |
| DE | 102019128721 A1 | 4/2021 | |

* cited by examiner

*Primary Examiner* — Karen Masih
(74) *Attorney, Agent, or Firm* — Seed Intellectual Property Law Group LLP

(57) ABSTRACT

A motor vehicle, having an externally excited synchronous machine and an inverter associated with the synchronous machine and connected to a high-voltage network and an exciter circuit associated with the synchronous machine to energize an exciter winding of the synchronous machine, comprising a power electronics layout having at least one intermediate circuit capacitor at the high-voltage network side, wherein the motor vehicle comprises a cooling device for cooling the power electronics layout and a voltage surge protection circuit is associated with the intermediate circuit capacitor, comprising at least one varistor, which becomes electrically conducting by the voltage imposed on it when a voltage threshold value is exceeded, wherein at least the one varistor of the voltage surge protection circuit forms part of an exciter module comprising the exciter circuit and a housing, which is thermally coupled to a cooling element of the cooling device for cooling the exciter module.

11 Claims, 3 Drawing Sheets

MOTOR VEHICLE HAVING AN EXTERNALLY EXCITED SYNCHRONOUS MACHINE

BACKGROUND

Technical Field

The disclosure relates to a motor vehicle, having an externally excited synchronous machine and an inverter associated with the synchronous machine and connected to a high-voltage network and an exciter circuit associated with the synchronous machine to energize an exciter winding of the synchronous machine, comprising a power electronics layout having at least one intermediate circuit capacitor at the high-voltage network side, wherein the motor vehicle comprises a cooling device for cooling the power electronics layout and a voltage surge protection circuit is associated with the intermediate circuit capacitor, comprising at least one varistor, which becomes electrically conducting by the voltage imposed on it when a voltage threshold value is exceeded.

Description of the Related Art

Electric machines are used in hybrid and electric motor vehicles, being associated with corresponding power electronics layouts or power electronics components, which are connected to a high-voltage onboard network at the vehicle side (in the following, a high-voltage network for short). Power electronics layouts may involve, for example, drive system inverters, high-voltage DC converters, onboard chargers, electric air conditioning compressors, and/or electric heaters, which are connected to the high-voltage network. The operating voltage of the high-voltage network is usually more than 200 V and can lie in the range of 350 Volt to 1000 Volt, for example.

If an externally excited synchronous machine is used, a further circuit will be used for the exciter winding in power electronics layouts for the synchronous machine, namely, an exciter circuit, by which the exciter winding can be energized. Oftentimes the exciter winding in motor vehicles is part of the rotor, from which it can be connected conductively to the exciter circuit by slip rings, for example. In externally excited synchronous machines, the use of cost-intensive magnets in the rotor can then be eliminated.

Since a sizeable power such as 15 kW also flows across the exciter circuit, it is also known in the prior art how to cool not only the inverter or its power modules, but also the exciter circuit.

Many such high-voltage components can be associated with intermediate circuit capacitors on the side with the connection to the high-voltage network. This also holds for the power electronics layout, where the inverter and the exciter circuit are often associated with at least one common intermediate circuit capacitor. In order to prevent damage, such capacitors may also be associated with voltage surge protection circuits, by which the excess electrical power can be diverted without endangering the intermediate circuit capacitor when no other energy sink is available, such as the battery of the high-voltage network. Such voltage surge protection circuits are often also called protection circuits for short.

High electric powers and thus voltages occur on the side with the exciter circuit, especially in operating modes when current from the exciter winding, and thus in particular rotor current, is supposed to be fed back to the high-voltage network. Problems may then arise in particular when the battery of the high-voltage network is not able to store the energy. This may be the case, for example, when a load shedding ("load dump") occurs, i.e., especially when the battery contactors are opened. By providing a voltage surge protection circuit, an excess charging of the intermediate circuit capacitor and a disruption, especially with fire danger, can be prevented.

Protection circuits known in the prior art may comprise, for example, a varistor switched in parallel with the intermediate circuit capacitor, which becomes electrically conductive when a certain voltage threshold value is exceeded and provides an ohmic load, by which the energy is transformed into heat in the voltage surge protection.

DE 10 2010 001 626 A1 discloses a circuit arrangement for voltage surge limiting of an exciter winding of a synchronous machine with rapid de-excitation. This calls for a protection circuit switched in parallel with the exciter winding, which does not allow any current to flow across the protection circuit in event of rapid de-excitation and forms at least one connection line between a control circuit and a current pathway for voltage limitation and de-excitation of the exciter winding. The protection circuit can have a varistor (voltage-dependent resistance).

CN 111 864 698 A discloses a voltage surge protection circuit for a rotor of a synchronous generator. The voltage surge protection circuit has an internal trigger circuit for turning on and off and thus for suppressing a voltage surge peak.

BRIEF SUMMARY

Embodiments of the disclosure provide an easily implemented possibility for the protection circuit of intermediate circuit capacitors in a motor vehicle having an externally excited synchronous machine, economizing on expense and complexity.

As the solution to this problem, it is proposed according to the disclosure, in a motor vehicle of the kind mentioned above, that at least the at least one varistor of the voltage surge protection circuit forms part of an exciter module comprising the exciter circuit and a housing, which is thermally coupled to a cooling element of the cooling device for cooling the exciter module.

Thus, according to the disclosure, it is proposed that the voltage surge protection circuit is integrated such that it belongs not only to the exciter circuit, but also at least the varistors are installed in an exciter module connected to the cooling system such that a better heat dissipation is produced, and therefore the voltage surge protection circuit also undergoes a cooling. Surplus electrical energy, especially a back current from the exciter winding, is dissipated in the form of heat and passed on to the cooling element and thus the cooling device. It has been recognized that a large amount of electrical energy may arise on the side with the exciter winding, which is substantially easier to control when an active cooling is provided, specifically in this case the connection to the active cooling of the power electronics layout. Thanks to the connection to the active cooling and the integration in the exciter module, the voltage surge protection circuit can have a minimal configuration, so that the expenditure in terms of costs and complexity is significantly reduced.

Another benefit of the configuration according to the disclosure is that the fabrication and/or assembly expense can be significantly reduced, since a surface mounting and/or the installing of a discrete voltage surge protection circuit is no longer necessary, because of the integration in the exciter module. The robustness of the overall system, especially the high-voltage network plus connected components, is increased, since the voltage surge protection function is provided by the power electronics layout, which furthermore also provides a suitable cooling port. The design space and the size of the unit are decreased.

The voltage surge protection circuit also continues to provide its corresponding protection function, since in particular the at least one intermediate circuit capacitor is protected by the parallel switched voltage surge protection circuit. Thus, the functional safety requirements can be met in all operating states of the motor vehicle, and in particular there is no danger of fire at the intermediate circuit capacitor thanks to the protection circuit. This holds in particular in event of a load shedding, in which a disruption of the power electronics layout by excess charging of the at least one intermediate circuit capacitor is prevented. Thanks to the use of varistors, the voltage surge protection circuit is configured such that, in normal operation of the motor vehicle, it has no influence on the function in the power electronics layout, and thus in particular the exciter circuit and the inverter. If, however, a fault situation should occur, current will be fed back, for example, from the exciter winding to the at least one intermediate circuit capacitor and if a defined critical value, represented by the voltage threshold value, is exceeded here, then the voltage surge protection circuit becomes active and takes up the back current of the exciter winding. Within the exciter circuit, especially the at least one varistor, the back current will be dissipated in the form of heat and passed on to the cooling device.

In other words, during a fault situation when the intermediate circuit voltage exceeds a defined, critical value, which is chosen to correspond to the voltage threshold value at the varistor, the varistor becomes low-impedance and takes up the feedback current of the exciter winding. Thus, the back current no longer flows to the at least one already fully charged intermediate circuit capacitor, which therefore is not disrupted. The electrical energy taken up by the voltage surge protection circuit is transformed into heat and passed on via the cooling element to the cooling system. This ensures that the energy will be dissipated as quickly as possible and that the protection circuit is additionally protected. If the intermediate circuit voltage again falls below the defined, critical value and thus the voltage on the at least one varistor is below the voltage threshold value, the varistors again become blocking and the power electronics layout returns to the normal operation without a fault present. During the fault, however, the significantly smaller and more economically designed protection circuit, i.e., the voltage surge protection circuit, can transform a very large amount of energy into heat, which is directly taken away, and furthermore the robustness of the voltage surge protection circuit is significantly enhanced by the connection to the active cooling.

Specifically, in the context of the present disclosure, it can be provided that the at least one varistor of the exciter circuit is switched in parallel with the at least one intermediate circuit capacitor, in particular between the exciter circuit and at least one intermediate circuit capacitor. Thus, the exciter circuit and the inverter utilize the same at least one intermediate circuit capacitor, which can be installed, for example, on the side with the inverter itself or also as a discrete unit, thus in particular separate from the inverter and the exciter circuit, in the power electronics layout. Through corresponding electric lines, the exciter circuit is also connected to the at least one intermediate circuit capacitor. However, configurations are also conceivable in which at least one of the at least one intermediate circuit capacitor can be provided on the side with the exciter circuit.

In an expedient modification of the disclosure it can be provided that the voltage surge protection circuit comprises at least two varistors switched in series in one varistor branch and/or at least two parallel varistor branches each having at least one varistor. Various reasons can make it advisable to employ multiple varistors. On the one hand, varistors are not always available whose voltage threshold value for the switching to the low-impedance state does not correspond exactly to the desired, already mentioned, defined critical value of the intermediate circuit voltage. Therefore, it may then be expedient to switch multiple varistors in series such that the desired voltage threshold for the intermediate circuit voltage results on account of the voltage threshold values of the varistors switched in series on the whole for this varistor branch. But also for reasons of power loss it may be expedient to switch multiple varistors in series and/or in parallel. Thanks to such a distribution of the impedance and the sites of transformation into heat, the local thermal input for the cooling element and thus the cooling device can also be suitably adapted to the given circumstances, in particular a single local hotspot at a single varistor can be avoided.

In order to create further degrees of freedom, an adapting of the circuitry can also be done on the side with the at least one intermediate circuit capacitor, in order to afford an optimal usage environment by corresponding voltage drop sections, for example, at voltage threshold value which are lower than the defined critical value, and/or to optimize the local thermal input. For example, multiple intermediate circuit capacitors can be switched in series in a capacitor branch, in order to provide connection points between them, which can be connected across electrical connection sections to connection points between varistors. Thus, in particular, the intermediate circuit voltage can be divided into suitable portions by the switching of intermediate circuit capacitors. In one specific exemplary embodiment, for example, it can be provided that two intermediate circuit capacitors are switched in series along at least one capacitor branch of the power electronics layout, and for at least one varistor branch of the voltage surge protection circuit having two varistors a first connection point situated between the intermediate circuit capacitors of the capacitor branch and a second connection point situated between the varistors of the varistor branch are connected across an electrical connection section. Given the same capacitances of the two intermediate circuit capacitors in the capacitor branch, half of the total intermediate circuit voltage will be present on the two intermediate circuit capacitors, so that, for example, the same varistors can be used in the varistor branch, each having a voltage threshold value which is half of the defined critical value for the intermediate circuit.

The at least one voltage threshold value of the at least one varistor can therefore be chosen such that the at least one varistor upon reaching a defined, critical value for the intermediate circuit voltage on the at least one intermediate circuit capacitor is switched to become electrically conducting. This means that the at least one varistor, in particular the multiple varistors, are switched off in regard to the goal of protecting the at least one intermediate circuit capacitor, so that their threshold value voltages are oriented accordingly to the defined, critical value of the intermediate circuit voltage. Specifically, for example, it can be provided that the defined critical value is more than 800 V, in particular more than 850 V, and/or it is chosen to be 1 to 3% and/or 5 to 15

V more than an operating voltage of the at least one intermediate circuit capacitor. At an operating voltage or also a rated voltage of 860 V for the high-voltage network, the defined, critical value can be chosen to be, for example, 870 V.

For the inverter, a B6 bridge circuit can be provided, for example, which provides at its corresponding outputs the three phases for the working windings, especially the stator windings. Regarding the exciter circuit, it can be provided that this is configured as a bridge circuit forming at least one half-bridge. In one exemplary embodiment, an asymmetrical full bridge circuit can be used as the exciter circuit, by which the different operating states can then be provided, as is basically known. For example, corresponding switch points can be provided for building up the exciter current, breaking down the exciter current, and current feedback.

In one expedient modification of the present disclosure it can be provided that also at least one part of the inverter is thermally connected to the cooling element for the cooling, in particular, as at least one power module comprising a housing. In especially advantageous configuration, one power module can be provided for each phase, the power modules being arranged, for example, alongside the cooling element. Besides the power modules, the exciter module can also be arranged on the cooling element, in order to make possible a compact design with the most optimal cooling possible.

BRIEF DESCRIPTION OF THE SEVERAL VIEWS OF THE DRAWINGS

Further benefits and details of the present disclosure will emerge from the exemplary embodiments described below, as well as the drawings.

DETAILED DESCRIPTION

Figure 1:
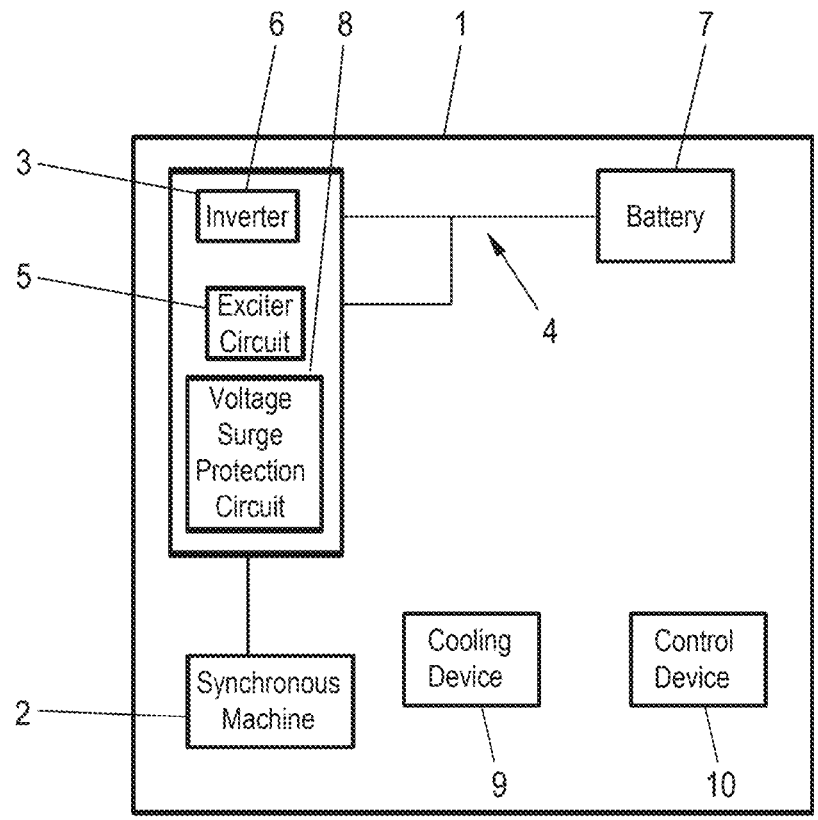
FIG. 1 shows a schematic of a motor vehicle according to the disclosure.

FIG. 1 shows a schematic of a motor vehicle 1 according to the disclosure, in the present instance an electric motor vehicle. The electric motor vehicle 1 comprises, in a drive train not otherwise shown, an electric machine, which is configured here as an externally excited synchronous machine 2. The externally excited synchronous machine 2 also serves as the electric motor for the electric motor vehicle 1. It comprises a rotor having an exciter winding and a stator with stator windings (not shown in FIG. 1), there being provided one stator winding for each of the three phases.

The externally excited synchronous machine 2 is connected across a power electronics layout 3 to a high-voltage network 4 of the motor vehicle 1. The power electronics layout 3 comprises an exciter circuit 5, by which the exciter winding is connected to the high-voltage network 4, and an inverter 6, by which the stator windings are connected to the high-voltage network 4.

The high-voltage network 4 has a higher voltage than a low-voltage network of the motor vehicle 1, which is not shown here. The operating voltage of the high-voltage network 4 can lie, for example, in a range over 200 V, in particular 350 to 1000 V, and it may be a DC voltage network. The high-voltage network 4 is fed from a battery 7. Further high-voltage components or network components can also be provided in the high-voltage network 4 and connected to it, such as a DC voltage converter provided between the low-voltage network and the high-voltage network, an onboard charger for the battery 7, an electrical air conditioning compressor and/or an electrical heater.

The power electronics layout 3 comprises an intermediate circuit having at least one intermediate circuit capacitor, while such intermediate capacitors storing electrical energy can also be provided in other components switched in parallel with it. The intermediate circuit is associated with a voltage surge protection circuit 8.

The motor vehicle 1 moreover comprises a cooling device 9, encompassing a cooling fluid which circulates in a cooling circuit and serves for cooling of the inverter 6 as well as the exciter circuit 5. The operation of various components within the motor vehicle 1 can be controlled by way of a control device 10.

Figure 2:
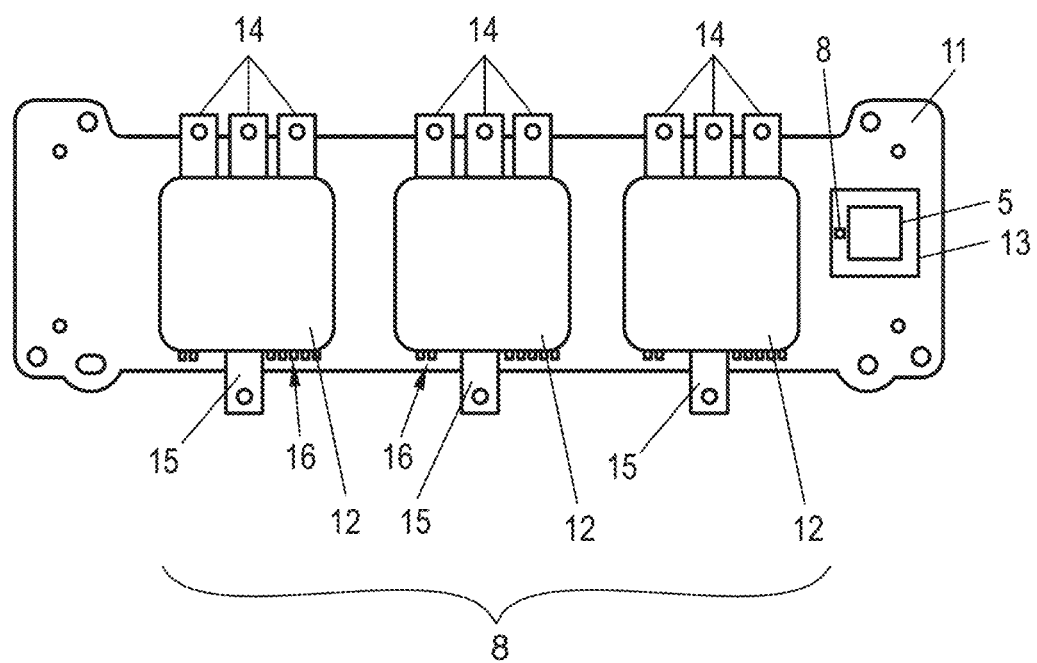
FIG. 2 shows a view of a cooling element with modules thermally coupled to it.

FIG. 2 shows as an example a cooling element 11 of the cooling device 9, which in the present case comprises at least one duct, not otherwise shown, and/or at least one cavity, through which cooling fluid flows in the cooling circuit. Besides power modules 12 for each phase, together forming the inverter 6, there is also mounted on the cooling element 11 an exciter module 13, thermally connected to it for cooling, in which the exciter circuit 5 and the voltage surge protection circuit 8 are arranged in a housing. Both the exciter circuit 5 and the voltage surge protection circuit 8 are cooled by way of the cooling element 11.

The power modules 12 can have housings containing the corresponding power electronics components, especially including semiconductor switches. In the present case, the power terminals 14 of the power modules 12 at the high-voltage network 4 and the power terminals 15 for the stator windings of the individual phases and corresponding activation terminals 16 are also shown. For clarity of drawing, these are not shown in the exciter module 13.

Figure 3:
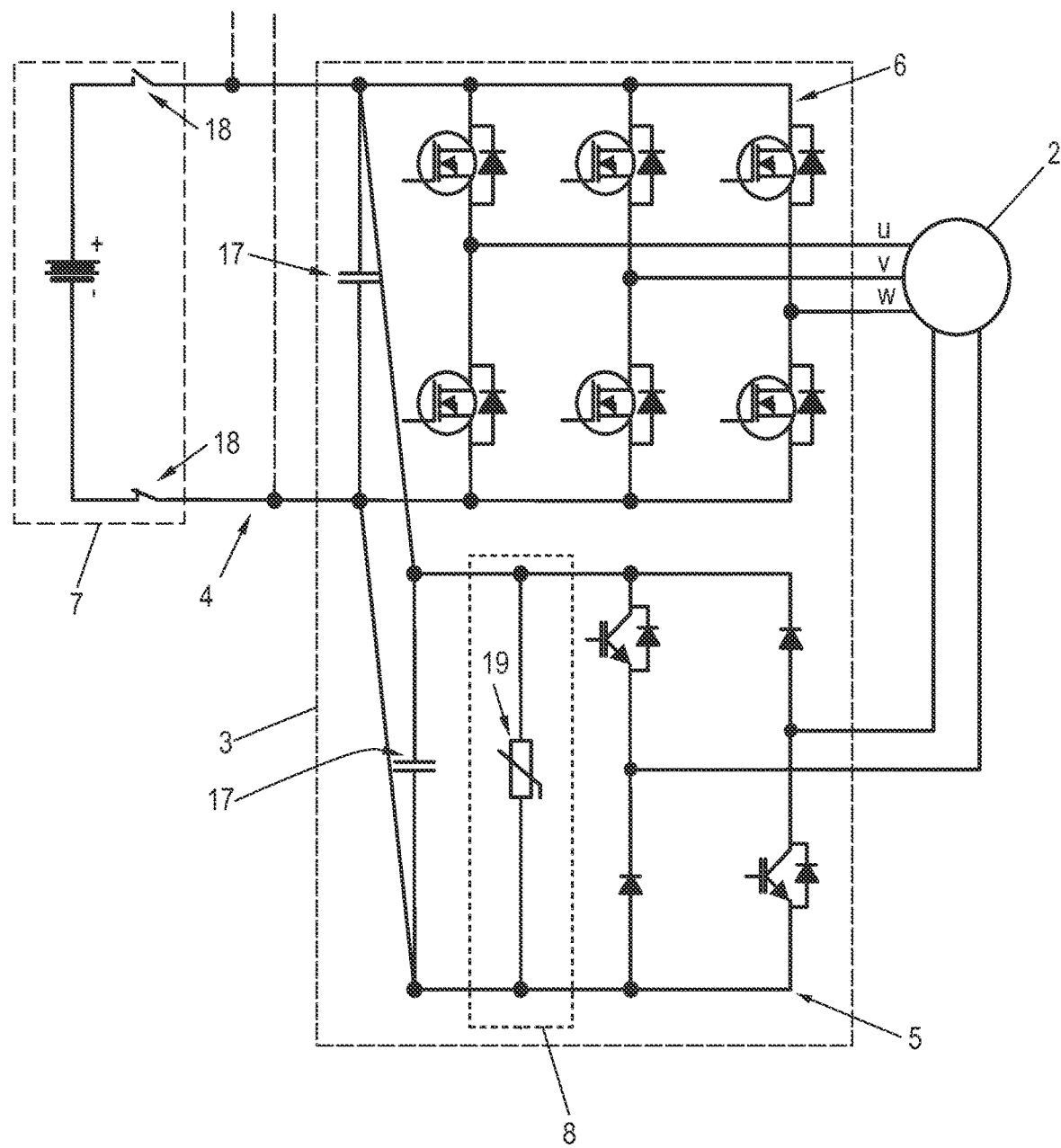
FIG. 3 shows a circuit diagram of a first exemplary embodiment of a power electronics layout.

FIG. 3 shows a circuit diagram of a power electronics layout 3 and nearby components in a first configuration. One notices the inverter 6 configured as a B6 bridge circuit in the upper region and the exciter circuit 5 configured as an asymmetrical full bridge in the lower region. The corresponding respective terminals for the externally excited synchronous machine 2 are also shown.

For the intermediate circuit in the present instance, two intermediate circuit capacitors 17 are shown as an example, being switched in parallel with the inverter 6 and the exciter circuit 5.

Moreover, FIG. 3 shows the battery 7 with its corresponding battery contactors 18. In event of a load shedding ("load dump"), the contactors 18 open, so that the intermediate circuit capacitors 17 constitute the principal remaining energy sink in the high-voltage network 4. If in this or some other case there is a feedback of exciter current from the exciter winding of the synchronous machine 2 across the exciter circuit 5, there is a danger of an overcharging of the intermediate circuit capacitor 17, a damaging or a disruption, possibly even a fire. For this reason, the power electronics layout 3 is the present case also comprises the already mentioned voltage surge protection circuit 8. This comprises, in the present exemplary embodiment, a varistor 19 switched in parallel with the intermediate circuit capacitor 17 and the exciter circuit 5. At least the varistor 19, in the present instance the entire voltage surge protection circuit 8, is installed in the exciter module 13, as already mentioned, so that in event of a fault, when the varistor 19 switches to become electrically conducting and transforms surplus energy, such as that from a back current of the exciter windings, into heat, this heat is passed on to the cooling element 11. Therefore, the voltage surge protection circuit 8, and especially the varistor 19, can be small in dimension.

It is possible to establish a defined, critical value of the intermediate circuit voltage, i.e., on the intermediate circuit capacitor 17, beyond which a fault situation must be assumed and the voltage surge protection circuit 8 should be activated. For example, it can be set at 5-15 V above the operating voltage. If the high-voltage network 4 has, for example, an operating voltage (rated voltage) of 860 V DC voltage, the defined, critical value can be taken to be 870 V.

The voltage threshold value at which the varistor 19 switches to become electrically conducting is attuned to this defined critical value and can be chosen to be equal to the defined critical value, since only one parallel switched varistor 19 is present.

If other varistors 19 are used, or those with lower voltage threshold values, it is also conceivable for the voltage surge protection circuit 8 to comprise multiple varistors 19, which can be switched in parallel and/or in series. In this way, a better local distribution of heat to be taken away by the cooling element 11 can also be achieved.

Figure 4:
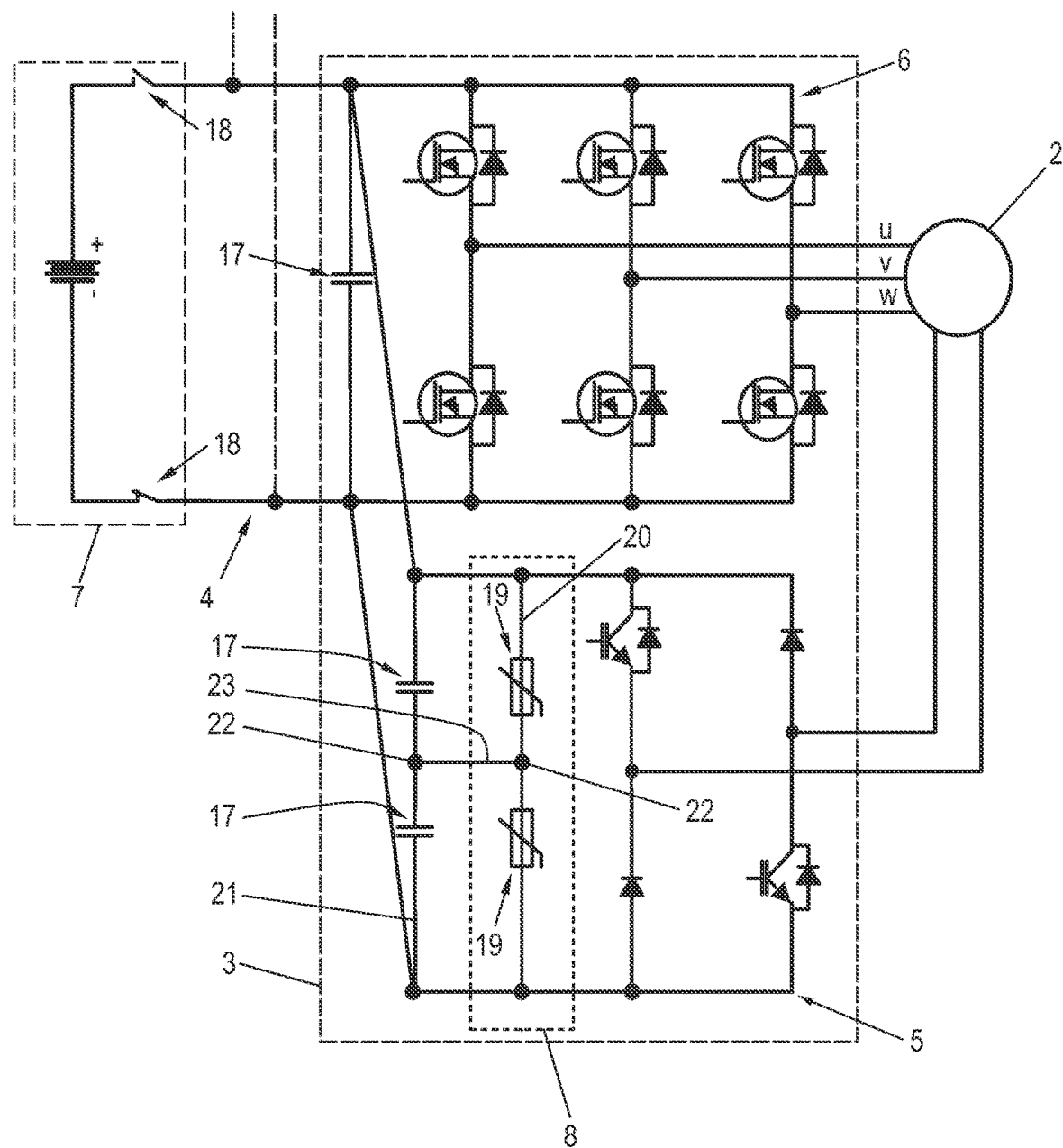
FIG. 4 shows a circuit diagram of a second exemplary embodiment of a power electronics layout.

FIG. 4 shows a second embodiment of a power electronics layout 3, in which two varistors 19 are switched in series in one varistor branch 20. In parallel with these, two intermediate circuit capacitors 17 are also switched in series in one capacitor branch 21. Each time connection points 22 are provided between varistors 19 and the intermediate circuit capacitors 17, being connected across a connection section 23. In this way, the intermediate circuit voltage can be divided up by way of the capacitors 17 of the capacitor branch 21 and applied accordingly to the varistors 19, which can be identical in particular and which can have, as their voltage threshold value, each time half of the defined, critical value. Of course, this can also be extended and applied to more complex configurations.

German patent application no. 102022118619.9, filed Jul. 26, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor vehicle, comprising:
an externally excited synchronous machine;
an inverter associated with the synchronous machine and connected to a voltage network;
an exciter circuit which, in operation, energizes an exciter winding of the synchronous machine;
a power electronics layout having at least one intermediate circuit capacitor at a side of the voltage network;
a cooling device which, in operation, cools the power electronics layout; and
a voltage surge protection circuit associated with the at least one intermediate circuit capacitor and including at least one varistor which, in operation, becomes electrically conducting by a voltage imposed on the at least one varistor when a voltage threshold value is exceeded,
wherein the at least one varistor of the voltage surge protection circuit forms part of an exciter module including the exciter circuit and a housing,
wherein the housing is thermally coupled to a cooling element of the cooling device, and
wherein the at least one varistor includes at least two varistors switched in series in one varistor branch or in at least two parallel varistor branches each having at least one of the at least two varistors.

2. The motor vehicle according to claim 1, wherein the at least one varistor, in operation, is switched in parallel with the at least one intermediate circuit capacitor.

3. The motor vehicle according to claim 1, wherein the at least one intermediate circuit capacitor includes two intermediate circuit capacitors that, in operation, are switched in series along at least one capacitor branch of the power electronics layout, and for at least one varistor branch of the voltage surge protection circuit having the at least two varistors a first connection point situated between one of the two intermediate circuit capacitors of the at least one capacitor branch and a second connection point situated between the at least two varistors of the at least one varistor branch are connected across an electrical connection section.

4. The motor vehicle according to claim 1, wherein at least one voltage value of the at least one varistor is such that the at least one varistor becomes electrically conducting upon reaching a defined critical value of an intermediate circuit voltage on the at least one intermediate circuit capacitor.

5. The motor vehicle according to claim 1, wherein the exciter circuit is configured as a bridge circuit forming at least one half-bridge.

6. The motor vehicle according to claim 1, wherein at least one part of the inverter is thermally connected to the cooling element of the cooling device.

7. The motor vehicle according to claim 6, wherein the at least one part of the inverter includes at least one power module including a module housing.

8. A motor vehicle, comprising:
an externally excited synchronous machine;
an inverter associated with the synchronous machine and connected to a voltage network;
an exciter circuit which, in operation, energizes an exciter winding of the synchronous machine;
a power electronics layout having at least one intermediate circuit capacitor at a side of the voltage network;
a cooling device which, in operation, cools the power electronics layout; and
a voltage surge protection circuit associated with the at least one intermediate circuit capacitor and including at least one varistor which, in operation, becomes electrically conducting by a voltage imposed on the at least one varistor when a voltage threshold value is exceeded,
wherein the at least one varistor of the voltage surge protection circuit forms part of an exciter module including the exciter circuit and a housing,
wherein the housing is thermally coupled to a cooling element of the cooling device,
wherein at least one voltage value of the at least one varistor is such that the at least one varistor becomes electrically conducting upon reaching a defined critical value of an intermediate circuit voltage on the at least one intermediate circuit capacitor, and
wherein the defined critical value is greater than 800 volts.

9. The motor vehicle according to claim 8, wherein the defined critical value is greater than 850 volts.

10. A motor vehicle, comprising:
an externally excited synchronous machine;
an inverter associated with the synchronous machine and connected to a voltage network;
an exciter circuit which, in operation, energizes an exciter winding of the synchronous machine;
a power electronics layout having at least one intermediate circuit capacitor at a side of the voltage network;
a cooling device which, in operation, cools the power electronics layout; and
a voltage surge protection circuit associated with the at least one intermediate circuit capacitor and including at least one varistor which, in operation, becomes electrically conducting by a voltage imposed on the at least one varistor when a voltage threshold value is exceeded,
wherein the at least one varistor of the voltage surge protection circuit forms part of an exciter module including the exciter circuit and a housing,
wherein the housing is thermally coupled to a cooling element of the cooling device,
wherein at least one voltage value of the at least one varistor is such that the at least one varistor becomes electrically conducting upon reaching a defined critical value of an intermediate circuit voltage on the at least one intermediate circuit capacitor, and
wherein the defined critical value is 1 to 3% greater than an operating voltage of the at least one intermediate circuit capacitor.

11. A motor vehicle, comprising:
an externally excited synchronous machine;
an inverter associated with the synchronous machine and connected to a voltage network;
an exciter circuit which, in operation, energizes an exciter winding of the synchronous machine;
a power electronics layout having at least one intermediate circuit capacitor at a side of the voltage network;
a cooling device which, in operation, cools the power electronics layout; and
a voltage surge protection circuit associated with the at least one intermediate circuit capacitor and including at least one varistor which, in operation, becomes electrically conducting by a voltage imposed on the at least one varistor when a voltage threshold value is exceeded,
wherein the at least one varistor of the voltage surge protection circuit forms part of an exciter module including the exciter circuit and a housing,
wherein the housing is thermally coupled to a cooling element of the cooling device,
wherein at least one voltage value of the at least one varistor is such that the at least one varistor becomes electrically conducting upon reaching a defined critical value of an intermediate circuit voltage on the at least one intermediate circuit capacitor, and
wherein the defined critical value is 5 to 15 volts greater than an operating voltage of the at least one intermediate circuit capacitor.

* * * * *